Oct. 16, 1951  J. R. WOOD  2,571,805
SHEET TAIL ACCELERATING DEVICE FOR SHEET FEEDERS
Filed Feb. 28, 1948  7 Sheets-Sheet 1

Fig. 1

INVENTOR.
JAMES R. WOOD
BY
Kwis Hudson Boughton & Williams
ATTORNEYS

Oct. 16, 1951  J. R. WOOD  2,571,805
SHEET TAIL ACCELERATING DEVICE FOR SHEET FEEDERS
Filed Feb. 28, 1948  7 Sheets-Sheet 2

INVENTOR.
JAMES R. WOOD
BY
Kwis Hudson Boughton & Williams
ATTORNEYS

Oct. 16, 1951 — J. R. WOOD — 2,571,805
SHEET TAIL ACCELERATING DEVICE FOR SHEET FEEDERS
Filed Feb. 28, 1948 — 7 Sheets-Sheet 4

Fig. 5

INVENTOR.
JAMES R. WOOD
BY
Kwis Hudson, Boughton & Williams
ATTORNEYS

INVENTOR.
JAMES R. WOOD

Oct. 16, 1951   J. R. WOOD   2,571,805
SHEET TAIL ACCELERATING DEVICE FOR SHEET FEEDERS
Filed Feb. 28, 1948   7 Sheets-Sheet 6

INVENTOR.
JAMES R. WOOD
BY
Kris, Hudson, Boughton & Williams
ATTORNEYS

Patented Oct. 16, 1951

2,571,805

UNITED STATES PATENT OFFICE 2,571,805

SHEET TAIL ACCELERATING DEVICE FOR SHEET FEEDERS

James R. Wood, Cleveland, Ohio, assignor to Harris-Seybold Company, Cleveland, Ohio, a corporation of Delaware Application February 28, 1948, Serial No. 11,970

30 Claims. (Cl. 271—51)

1

This invention relates to improvements in sheet feeding mechanism, that is to say mechanism for conveying sheets from a supply and presenting them one after another to the working point of a sheet handling machine, such for example as a printing press. The invention more particularly relates to mechanism for advancing sheets from a supply to a registering position, for example on a feed board, and transferring them to an impression cylinder or the like. The present application is a continuation-in-part of my copending application No. 546,822 filed July 27, 1944, now forfeited.

One of the objects of the invention is the provision of a method and means for feeding sheets characterized by simplicity, efficiency, smoothness of operation and the ability to feed relatively long sheets at high speed in accurate register.

Another object is the provision in connection with stream fed sheets, wherein each sheet is conveyed into close proximity to a registering position while partly lapped by a preceding sheet, of mechanism which shall positively displace the body of said preceding sheet from the path traversed by its leading edge in such manner as to cause the rear edge of the same to be completely withdrawn from the succeeding sheet not later than at a given point in the feeding cycle, which point shall be closely prior to the time the front edge of said succeeding sheet reaches said registering position.

Another object is the provision in connection with stream fed sheets of mechanism for accelerating the withdrawal of sheets from the feed board of a printing press under positive control.

Another object is the provision, in sheet feeding mechanism employing front guides, of improved means for advancing the rear edge of each sheet at a speed greater than the speed of the leading edge and for carrying the rear edge past the front guides at a definite point of the feeding cycle which is earlier than would be the case if such advancing means were not provided.

Another object is the provision of mechanism for this purpose which shall be substantially balanced and shall operate smoothly and without vibration.

A further object is the provision of means for controlling the rear edge of the sheet after it leaves the front guides and while the loop in the intermediate portion of the sheet is being taken out.

Still another object is the provision of means for accelerating the rear edge of the sheet which shall be adjustable in order that the increased

2 speed of the rear edge may be no greater than that needed to compensate for the degree of overlap of the sheets in the stream, whereby the means for controlling the rear edge of the sheet may maintain its hold upon shorter sheets as well as upon those of maximum length; in other words so that the loop forming mechanism may not take the shorter sheets out of the field of operation of the rear edge controlling means before that means has completed its function.

Other objects and features of novelty will appear as I proceed with the description of that embodiment of the invention which, for the purposes of the present application, I have illustrated in the accompanying drawings, in which.

In the drawings a feed board is illustrated at 10, being provided with front guides 9 which move into and out of operative position at properly timed intervals in a manner well known in the art. 11 and 12 are side registering wheels which grip the sheet momentarily after it is front registered and draw it sidewise into contact with a side guide 13, such mechanism being also well known in the art.

Sheets are conveyed along the feed board 10 by conveyor tapes 7 trained about roller 8 in conjunction with idler wheels not shown, which press the sheets against the tapes, all as known in the art. The tapes 7 are arranged to convey the sheets at a speed less than the operating speed of the sheet handling machine with the rear portion of each sheet overlying the succeeding sheet.

Figure 1:
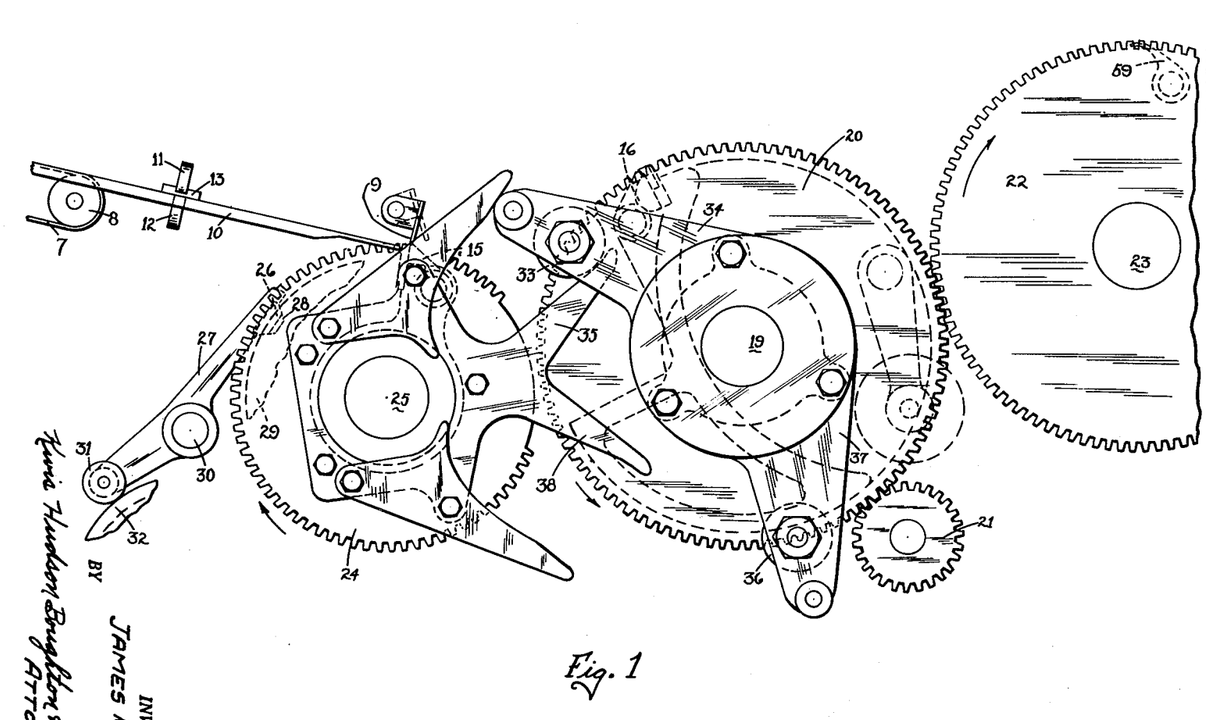
Fig. 1 is a side view, somewhat diagrammatic in character, of feeding mechanism embodying the invention, and illustrating more particularly a driving means which I employ in connection with the invention for taking the forward edge of a sheet from the feed board and accelerating it to the surface speed of the printing or sheet handling machine.
Figure 2:
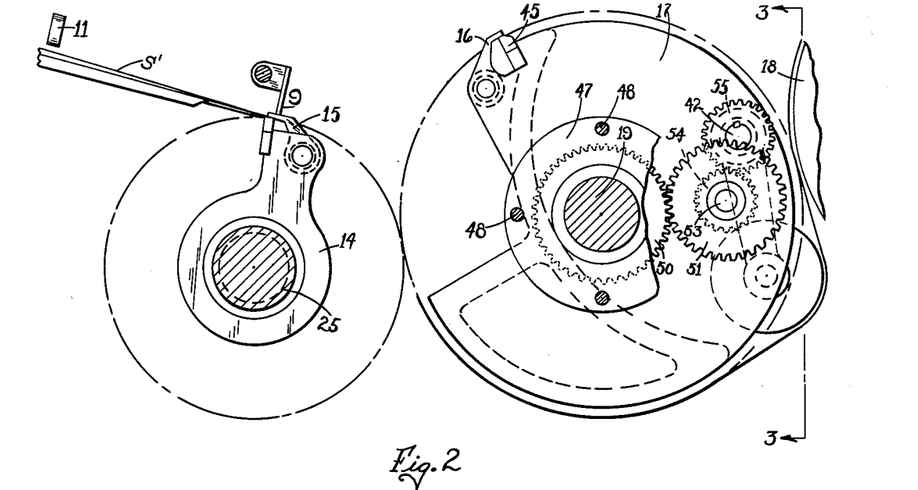
Fig. 2 is a side view, with certain parts removed and other broken away, to illustrate operating mechanism which may be employed for accelerating the rear edge of the sheet, the view being taken substantially on the line 2—2 of Fig. 3.
Figure 3:
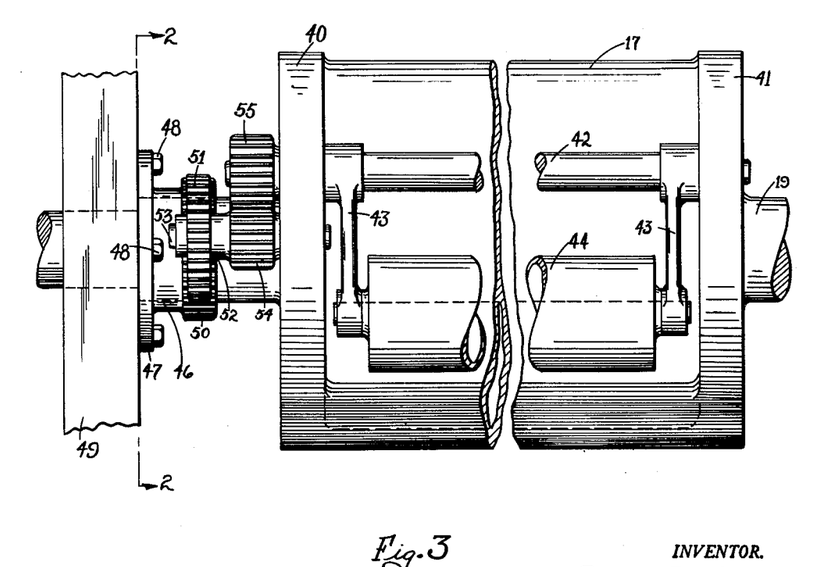
Fig. 3 is a fragmental elevational view looking substantially in the direction of arrows 3—3 of Fig. 2.
Figure 4:
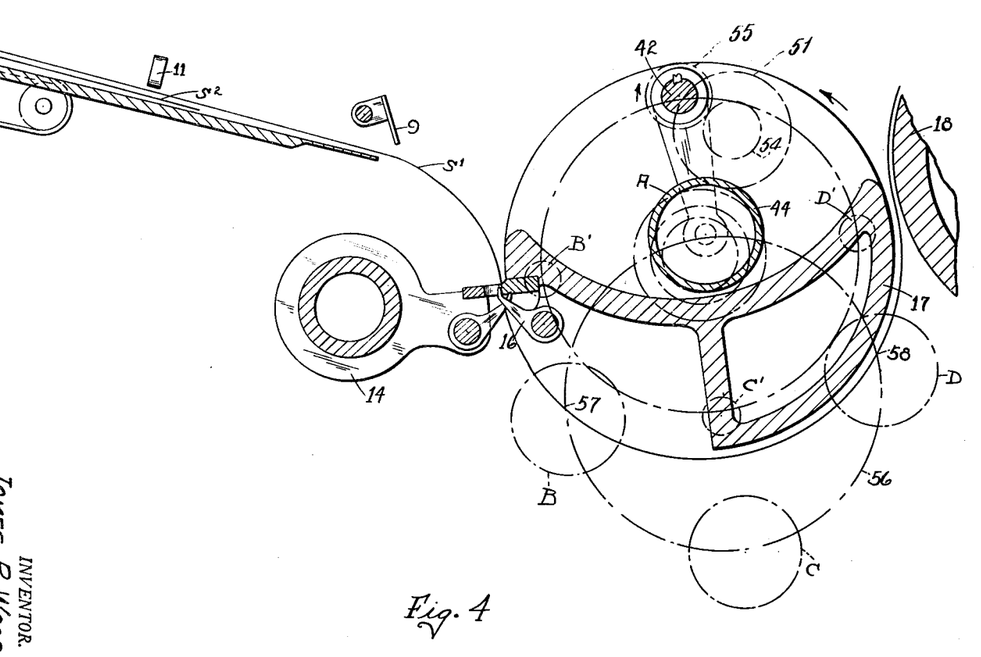
Fig. 4 is a vertical sectional view, largely diagrammatic, showing a sheet carrier in position to take a sheet from the accelerating transfer device.

14 is a rotary transfer device operating at variable speed and coming to rest at one point with its sheet grippers 15 in the position shown in Figs. 1 and 2. After this device has taken a sheet from the feed board, it advances at an accelerating rate to a position just behind that illustrated in Fig. 4 where it is traveling at a constant speed, and where it transfers the sheet to grippers 16 on a revolving carrier 17 which turns at the same constant peripheral speed to advance the sheet at a rate of travel equal to the surface speed of the impression cylinder, indicated at 18 in the drawings. Carrier 17 is mounted upon a shaft 19 to which is fixed at one side of the machine a gear 20 that is driven by a small gear 21. A gear 22 fixed upon the shaft 23 of the impression cylinder 18 meshes with gear 20 and is driven thereby. Gear 20 also meshes for part of a cycle with a partial gear 24 on a shaft 25 which carries the transfer device 14.

In the condition of the parts illustrated in Fig. 1, the transfer device 14 is momentarily locked against movement by a beveled block 26 on one end of a lever 27, block 26 taking into a similarly shaped notch 28 in a member 29 rotating with the transfer device. Lever 27 is pivotally mounted at 30 and is oscillated between operative and non-operative positions by a follower 31 running upon a rotating cam 32. As soon as the cam 32 permits, the block 26 disengages notch 28, and at about the same time a roller 33 on an arm 34 which is fixed upon carrier 17 is caused to run down a cam arm 35 fixed with respect to transfer device 14, thereby accelerating that device from zero speed to a surface speed equal to that of carrier 17, whereupon the teeth of gear sector 24 engage with those of gear 20 and the transfer device turns at constant speed until a roller 36 on an arm 37 rigid with carrier 17 engages the inner end of a cam arm 38 on the transfer device and runs outwardly along that arm, thereby decelerating the transfer device and bringing it to a stop, at which time the block 26 again engages notch 28. For a more complete description of this drive mechanism reference should be had to Patent No. 2,192,908, dated March 12, 1940.

In the end walls 40 and 41 of rotating carrier 17 there is journaled a shaft 42, to which are secured a pair of arms 43. At the outer ends of these arms there are bearings for the trunnions of a hollow roller 44, constructed preferably of lightweight material. Shaft 42 is disposed near the periphery of carrier 17 at a point spaced angularly from the pad 45 for grippers 16 about 90° behind the pad, that is with respect to the direction of rotation of the carrier.

A sleeve 46 with a mounting flange 47 surrounds shaft 19 and is secured by studs 48 or the like to a frame member 49. This stationary sleeve has a gear 50 cut therein which meshes with a gear 51 carried by a hub 52 which turns freely on a stub shaft 53 which is mounted in end wall 40. Hub 52 also carries a smaller gear 54 which meshes with a gear 55 keyed to a projecting end of shaft 42. This gearing is so designed that, for each revolution of carrier 17, shaft 42 is caused to turn one revolution in the opposite direction. This produces a constant speed movement of roller 44 in a circular path, the movement of the roller axis being indicated in Fig. 4 by the broken line 56. It will be noted that this circular path intersects the path of the closed grippers 16 at points 57 and 58, and that the position of roller 44 at the greatest distance from the center of carrier 17 is about halfway between the position of grippers 16 in Fig. 4 where the sheet is taken from the transfer device 14, and the position of the grippers in Fig. 5 where the sheet is released to be taken by the impression cylinder grippers 59. 60 and 61 are guard rails or grids to confine the rear portion of the sheet after it leaves the feed board.

The mass of carrier 17 is so disposed that the carrier, together with the shaft 42, roller 44, arms 43 and the rotating gears, is substantially in static balance in all positions. Furthermore, the motion of roller 44 is continuous and at constant speed. Vibration is thereby reduced to a minimum.

Figure 5:
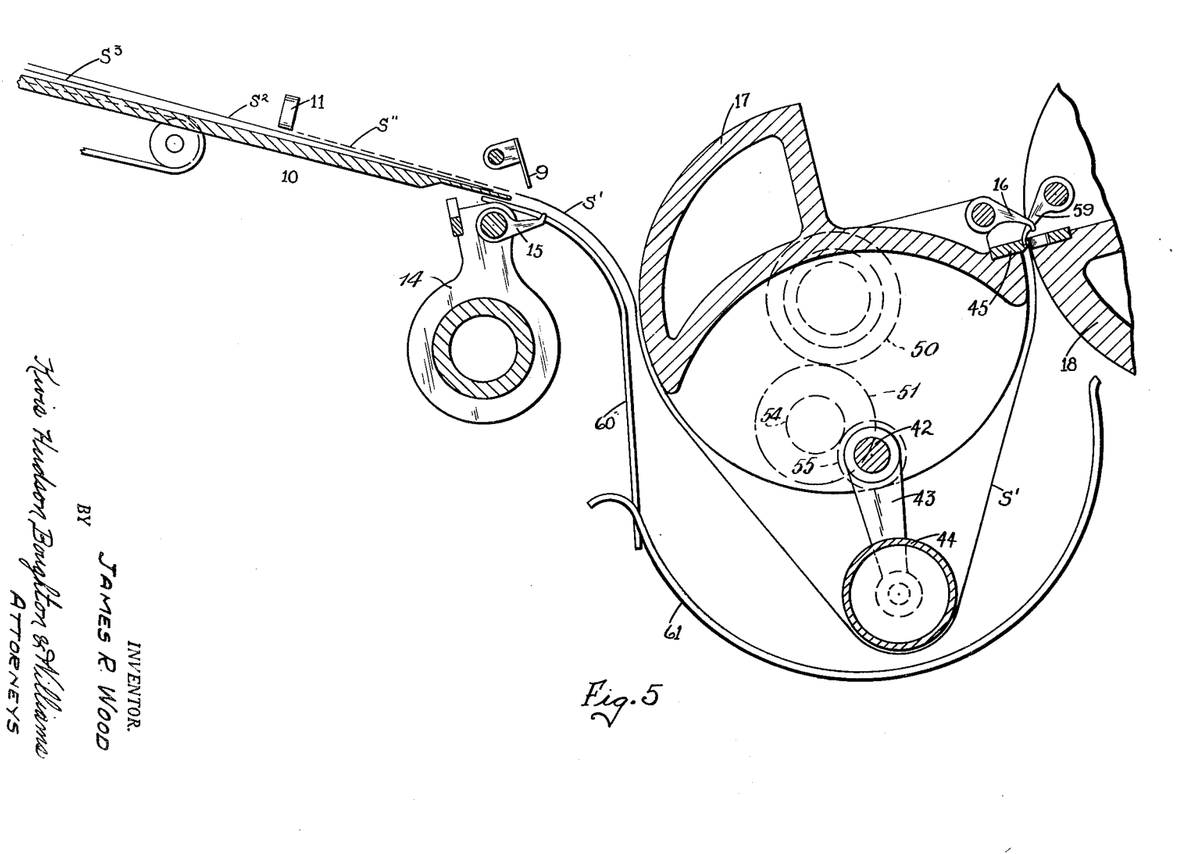
Fig. 5 is a similar view showing the carrier as it releases the sheet to an impression cylinder or the like, with the mechanism for accelerating the rear edge of the sheet in its outermost position.
Figure 6:
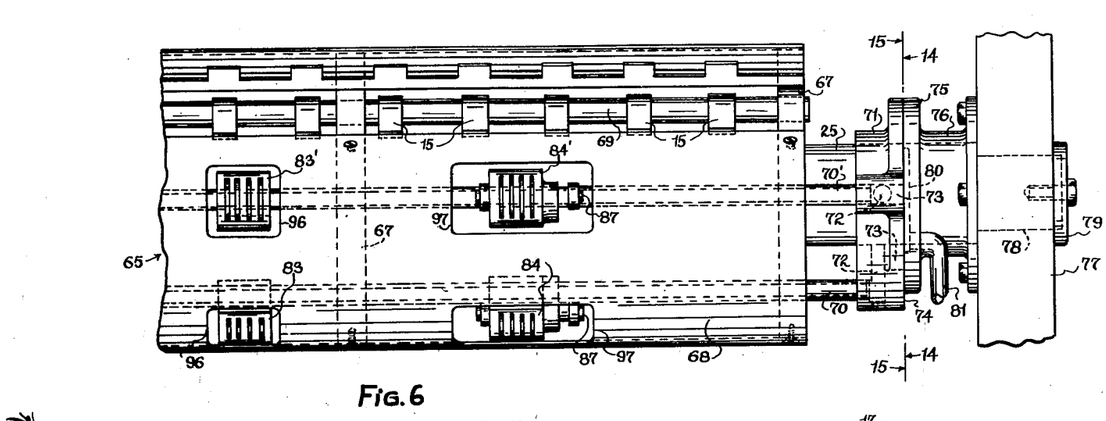
Fig. 6 is a fragmental view of a modified form of rotary transfer device looking in the direction of arrows 6—6 of Fig. 8.
Figure 7:
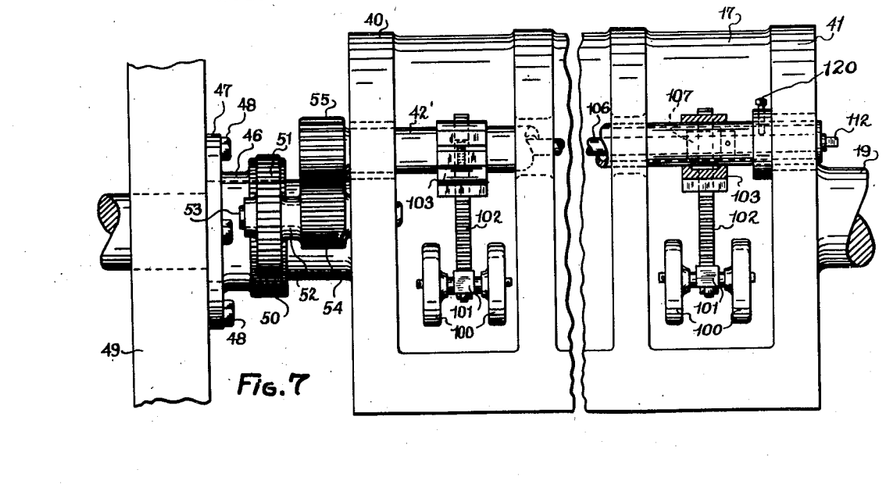
Fig. 7 is a view similar to Fig. 3 of the modified form of the invention.

*Operation.*—Sheets are conveyed down the feed board 10 by tapes 7 in a continuous stream, S', S², S³, etc., each one overlapped by the one next preceding it. With the parts in the position of Fig. 2, a sheet S' has been brought to a stop, front registered against guides 9, side registered against guide 13, and is in the grip of fingers 15. The transfer device 14 now starts to move clockwise and is quickly accelerated by the mechanism illustrated in Fig. 1 until it reaches the surface speed of carrier 17. Grippers 15 and 16 reach a position in alignment with the centers of shafts 25 and 19 simultaneously, and the front edge of the sheet is transferred from grippers 15 to grippers 16. At this time the roller 44 is at position A, Fig. 4. By the time the grippers 16 have advanced counterclockwise through an angle of 90°, shaft 42 will have reached position B' and will have turned clockwise through an angle of 90° so that roller 44 will be in position B and will have engaged the inner surface of sheet S' and have accelerated the rate of movement of the rear edge of the sheet to some extent. By the time carrier 17 has revolved through another 90° angle, at which time grippers 16 will be in the position of Fig. 5, shaft 42 will have reached position C' and will have turned clockwise another 90° to dispose roller 44 in position C, where the roller will have completed its outward movement and will have fully accelerated the travel of the rear edge of the sheet. Its disposition at this stage of the cycle is shown in Fig. 5, where the sheet, illustrated by a single solid line, is shown with its rear edge clearing the front guides 9 of the feed board.

It is to be noted that the accelerating mechanism of this invention acts positively upon each sheet so as to withdraw its rear edge off the succeeding sheet not later than at a given point in the feeding cycle, since the sheet cannot extend farther back on the feed board than is permitted by the shortest path extending from grippers 16 around the roller 44. It is also to be noted that the position of the sheets on conveyor tapes 7 is so chosen that the next underlying sheet S² (Fig. 5) is closely adjacent to the front guides at the moment its front edge is uncovered and that the front guides are lowered into operative position as soon as they are cleared by the rear edge of sheet S'. Thus the registration of sheet S² is begun almost immediately after it has been uncovered by sheet S' and full advantage of the earlier and longer available registering period is taken. This accurate timing of the front guides and the front edges of the sheets is made possible by the positive and reproducible effect of the mechanism in withdrawing the rear edges of successive sheets always at the same time in the feeding cycle.

After the forward edge of sheet S' has been transferred to grippers 59 on the impression cylinder, the next 90° movement of the carrier 17 will bring the shaft 42 to the position D', and the rotation of shaft 42 will carry the roller 44 to the position D. Hence the roller 44 is within the confines of the carrier 17 during approximately half of each revolution of the carrier and projects outwardly therefrom to a greater or lesser extent during the other half revolution.

In the second form of the invention illustrated in Figs. 6 to 15 inclusive the general construction and the operation are similar to the construction and operation of the first form of the invention. However this modified construction includes means for controlling the rear edge of the sheet during its travel over the surface of the rotary transfer device, and additionally it includes means for adjustably varying the degree of acceleration of the rear edge of the sheet in order that the latter may be pulled off the feed board just ahead of the front registration time of the next sheet, thereby accommodating sheets of different lengths with consequent different overlaps in the stream of sheets.

Figure 8:
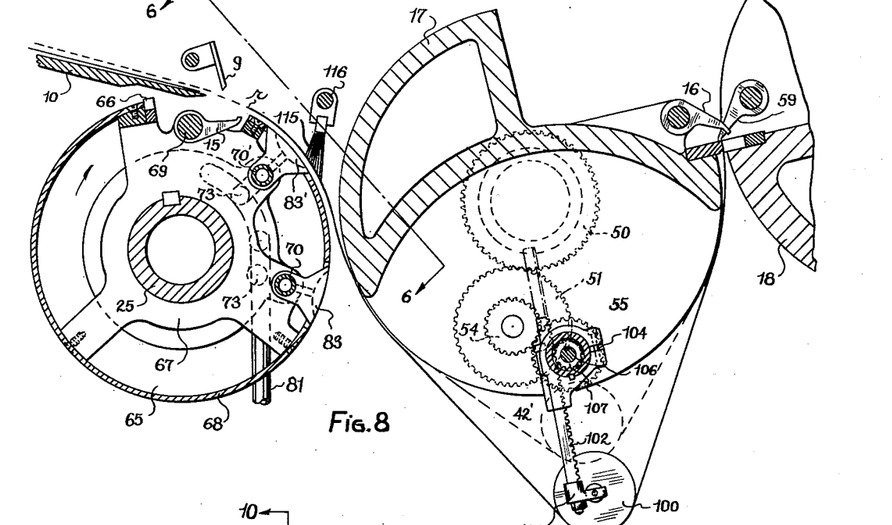
Fig. 8 is a vertical sectional longitudinal view of the modified form of the invention, with the principal parts in the relative positions substantially of Fig. 5.

The transfer device 65 corresponds in function to the transfer device 14, and may be driven intermittently by the mechanism illustrated in Fig. 1 or by other mechanism producing variable speed rotation. It may slow down merely or come to a complete stop in the sheet taking position. In Fig. 8 it is illustrated at approximately the beginning of its decelerating movement. It will take a sheet from the feed board 10 when its gripper pads 66 reach a position even with the front stops 9 in the operative position, not shown, of the latter.

The transfer device 65 comprises several spiders 67 secured to a shaft 25 and a sheet metal casing 68 which is interrupted to accommodate the shaft 69 and its grippers 15, this shaft having bearings in spiders 67. Spiders 67 also carry two pipes 70 and 70' that are closed at one end, their opposite ends projecting into a head 71 which rotates with shaft 25. In this head there are radial passages 72 which lead to offset holes 73 extending inwardly from a machined surface 74 of the head. This surface 74 mates with a machined surface 75 on a stationary sleeve 76 that is secured to a frame member 77. Shaft 25 turns in sleeve 76 and has a reduced diameter end portion 78 which extends through an opening or bearing in the frame element and may have a retaining plate 79 secured thereto to prevent endwise movement of the shaft and insure a fluid-tight joint between the surfaces 74 and 75. In the enlarged inner end of sleeve 76 there is an arcuate groove 80 with which the holes 73 register during each revolution of shaft 25. A conductor 81 leading to a source of vacuum communicates with groove 80. Consequently pipes 70 and 70' become suction pipes whenever the corresponding holes 73 register with the groove 80.

Figure 13:
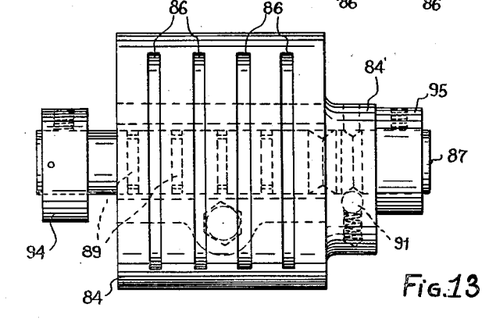
Figure 14:
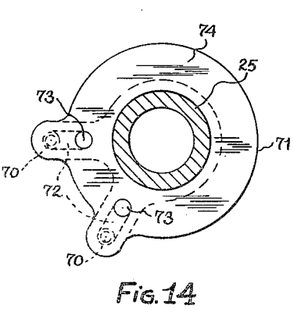
Figs. 14 and 15 are cross-sectional views taken substantially on the lines 14—14 and 15—15 respectively of Fig. 6.
Figure 15:
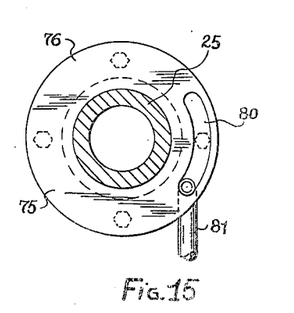

Spaced at regular intervals along the length of the pipes 70 and 70' there are sucker heads 83 and 83' which are fixed to the pipes 70 and 70' and communicate continually with the interior of those pipes. Near each end of transfer device 65 there are sucker heads 84 and 84' shown in detail in Figs. 11, 12 and 13 which may be thrown out of communication with the pipes 70 and 70' quickly and easily when narrow sheets are being handled. These latter sucker heads are clamped to the pipes 70 and 70' by means of clamping screws 85. The face of each sucker head has an arcuate surface flush with the surface of cylindrical casing 68. In it are a plurality of parallel slots 86. A valve rod 87 extends through a bore 88 in the head parallel with the pipe 70 or 70'. Annular grooves 89 are formed in this rod spaced apart the same distance as slots 86. Drilled holes 90 aligned with the slots 86 connect the interior of pipe 70 and 70' with the bore 88 and with the grooves 89 when the rod 87 is in the position illustrated in Fig. 12. Suction at this time is available in the slots 86. Head 84 has an extenson 84' in which is mounted a ball detent 91 that takes into a V-shaped groove 92 in the rod 87 and releasably holds the rod in that position. The operator however may push the rod toward the left from the Fig. 12 position until detent 91 snaps into groove 93, whereupon the grooves 89 of the valve will be out of communication with the slots 86 and suction through these slots will be cut off as indicated in Fig. 13. Collars 94 and 95 on rod 87 prevent accidental movement of the rod too far in either direction. Windows 96 and 97 are formed in the cylindrical casing 68 to expose the suckers 83, 83', 84 and 84' for contact with the sheets being fed.

A series of brushes 115 mounted at intervals on a fixed rod 116 extending the full width of the machine press against the sheet in its travel over the surface of the transfer device 65, holding it against that device and the sucker heads 83 and 84 carried thereby. These brushes assist in making suction in the sucker heads effective to control the sheets passing thereover. In addition they have an effect independently of the suckers, that is they hold the sheets in contact with the transfer device, so that as the latter decelerates it places a drag on the sheet.

Figures 9, 10:
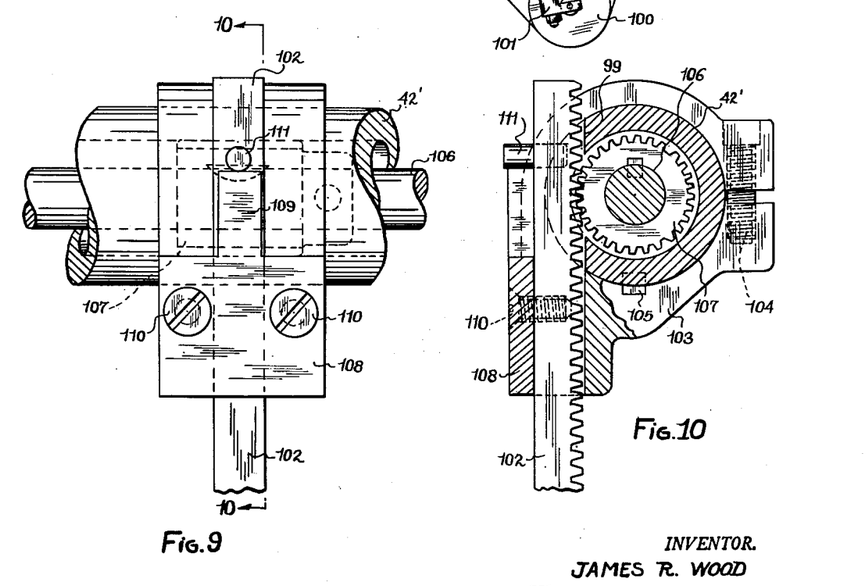
Figs. 9 and 10 are fragmental detail elevational and sectional views respectively on a larger scale of adjusting mechanism employed in connection with the modified form of the invention, Fig. 10 being partially in section on the line 10—10 of Fig. 9.
Figure 11:
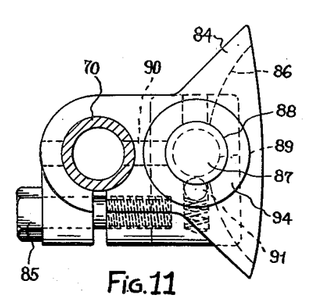
Fig. 11 is an end elevational view of a sheet controlling sucker which may be used in the second form of the invention.
Figure 12:
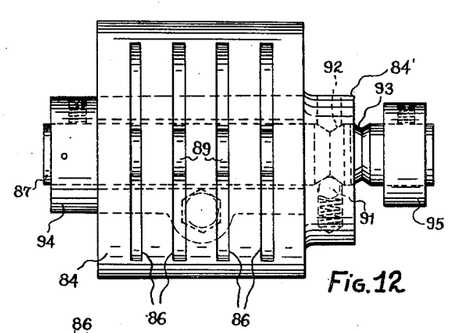
Figs. 12 and 13 are front elevational views of the sucker, showing valve means in operative and inoperative positions respectively.

In this second form of the invention the roller 44 is replaced by a series of pairs of wheels 100 having an equivalent function, each pair of wheels being rotatably mounted in a bracket 101, carried at the outer end of a rack 102 which is mounted to slide within a guide groove formed in a split bracket 103 that is clamped to the shaft 42' by a clamping screw 104. The bracket is secured against rotation relative to the shaft by means of a key 105. Shaft 42' is hollow, and through it extends an adjusting shaft 106 to which are keyed a series of pinions 107, one pinion meshing with each rack 102. The teeth of these pinions bear rotatably on the internal wall of the hollow shaft 42', and thus form bearings for the shaft 106. A plate 108 with a central extension 109 is mounted on the bracket 103 by means of screws 110. A pin 111 is mounted in the rack 102 and contacts the extension 109 on plate 108 to limit the outward travel of the rack, as indicated in Figs. 9 and 10. The hollow shaft 42' must of course have transverse slots 99 machined therein to accommodate each of the racks 102. The shaft 106 projects through one end of hollow shaft 42' and is there provided with a squared end 112 to receive a wrench by means of which pinions 107 may be rotated to effect movement of the racks inwardly or outwardly. Suitable means, such as a set screw 120, may be provided for preventing accidental rotation of shaft 106 relative to shaft 42'.

*Operation of the second form of the invention.*—In setting up the machine for feeding sheets of a given length, the racks 102 are adjusted to project just far enough in their outermost position so that when the front stops 9 are about to register the next sheet the rear edge r of the preceding sheet will be slightly in advance of the operative position of the front stops. When the racks are in their outermost position with the pins 111 engaging the projections 109 the mechanism is set for handling the longest sheet within the capacity of the press. The longer the sheets fed the greater will be the overlap between adjacent sheets in the stream. Consequently with long sheets the acceleration of the rear edge must be relatively rapid in order to remove the overlap before the front stops come into operative position for the next sheet. Therefore the loop placed in the intermediate portion of the sheet by the wheels 100 must be relatively long. In Fig. 8 the position of wheels 100 for creating the maximum loop is in full lines, while a second position for creating a considerably shorter loop is shown in broken lines.

When the grippers 15 of the transfer device take a sheet they carry forward its front edge under the brushes 115, and when the grippers pass the plane through the axes of the transfer device 65 and the sheet carrier 17, they release the sheet and grippers 16 take it. The entire sheet than advances at a speed corresponding to the surface speed of carrier 17, which is the same as that of impression cylinder 18. When however the wheels 100 begin to emerge from the periphery of carrier 17 a loop begins to form and the rear edge of the sheet begins to accelerate. At this time brushes 115 by pressing the sheet against the rotating transfer device 65 exert some control upon the sheet and tend to maintain it taut during the formation of the loop. Shortly thereafter sucker heads 83 and 84 come into the path of the sheet and create a slight drag that maintains the sheet taut as the wheels 100 move toward their outermost position. Before the sucker heads 83 and 84 pass out of the path of the sheets suckers 83' and 84' enter its path, and at about that time the transfer device 65 begins to decelerate. The drag of sucker heads 83' and 84' is therefore maintained until about the time the transfer device 65 reaches a full stop and the grippers 15 are in position to take the next sheet. The sucker heads 83' and 84' therefore exert control on the rear portion of the sheet during the inward travel of the wheels 100, which is an important function inasmuch as the intermediate and rear portions of the sheet are then not being drawn forward at as great a speed as the forward edge. The mechanism can be so designed that by the time the sucker heads 83' and 84' release the sheet the wheels 100 will have been retracted within the periphery of the carrier 17 and the further travel of the rear edge of the sheet over the carrier 17 will be like that of the conventional feeding cylinder.

Having thus described my invention, I claim:

1. In a machine for operating on sheets, a revoluble carrier, sheet gripping means adapted to grip and advance the leading edge of a sheet, said means comprising grippers on said carrier and means mounted on said carrier moving at a speed at all times proportional to the speed of the grippers in a complete circular path intersecting the path of the grippers adapted to engage the sheet to advance the trailing edge of the sheet more rapidly than the leading edge thereof, said sheet gripping means maintaining its hold upon the sheet until after said last named means has moved to the outermost point of its circular path.

2. In a machine for operating on sheets, a revoluble carrier, sheet gripping means adapted to grip and advance the leading edge of a sheet, said means comprising grippers on said carrier, and means mounted on said carrier moving at constant speed in a complete circular path intersecting the path of the grippers adapted to engage the sheet to advance the trailing edge of the sheet more rapidly than the leading edge thereof, said sheet gripping means maintaining its hold upon the sheet until after said last named means has moved to the outermost point of its circular path.

3. In a machine for operating on sheets, a rotary sheet advancing device comprising a revoluble carrier having its center of gravity eccentric to its center of rotation and including sheet grippers, means supported on said carried rotatable through a complete revolution about a center moving with the carrier adapted to engage an advancing sheet to advance the trailing edge of the sheet more paridly than the leading edge thereof, and means for rotating said trailing edge advancing means about its center, the arrangement being such as to cause said rotary sheet advancing device to be substantially in static balance in all positions thereof.

4. In a machine for operating on sheets, a feed table, sheet gripping means adapted to grip and advance the leading edge of a sheet, said means comprising first grippers for taking a sheet by its leading edge from the feed table and advancing it toward an operating point, said means also comprising second grippers moving at constant speed in a circular path for taking the sheet from said first grippers and further advancing the sheet by its leading edge, and means moving at constant speed in a complete circular path intersecting the path of the second grippers adapted to engage the sheet to advance the trailing edge of the sheet more rapidly than the leading edge thereof, said sheet gripping means maintaining its hold upon the sheet until after said last named means has moved to the outermost point of its circular path.

5. In a machine for operating on sheets, a revoluble carrier, sheet gripping means adapted to grip and advance the leading edge of a sheet, said means comprising grippers on said carrier, a shaft mounted in the carrier eccentric to the center of rotation of the carrier, means for revolving the shaft relative to the carrier once for each revolution of the carrier in the opposite direction to that of the carrier, and means moving with said shaft adapted to contact and displace a sheet held by said grippers, said sheet gripping means maintaining its hold upon the sheet until after said last named means has moved to the outermost point of its circular path.

6. In a machine for operating on sheets, a revoluble carrier, sheet gripping means adapted to grip and advance the leading edge of a sheet, said means comprising grippers on said carrier, a shaft mounted in the carrier eccentric to the center of rotation of the carrier, a stationary gear mounted concentric with the center of rotation of the carrier, a driving connection between the shaft and the stationary gear arranged to cause rotation of the shaft relative to the carrier at the rate of one revolution for each revolution of the carrier, and means moving with said shaft adapted to contact and displace a sheet held by said grippers, said sheet gripping means maintaining its hold upon the sheet until after said last named means has moved to the outermost point of its circular path.

7. In a machine for operating on sheets, means for presenting sheets one at a time to a given point of the machine, an impression cylinder, a non-uniformly rotating first transfer member adapted to take a sheet from the sheet presenting means and advance it toward the impression cylinder, a uniformly rotating second transfer member adapted to take a sheet from the first transfer member and transfer it to the impression cylinder, means carried by the second transfer member functioning while the sheet is held by that member for accelerating the withdrawal of an advancing sheet from the sheet presenting means, and driving connections between said transfer members for imparting non-uniform rotation to the first transfer member from the second.

8. In mechanism of the class described, a revolving sheet carrier, sheet gripping means adapted to grip and advance the leading edge of a sheet, said means comprising grippers on said carrier, a shaft eccentrically journaled in the carrier and rotating in a direction opposite to that of the carrier, means mounted on said shaft and moving in a closed path outwardly and inwardly across the path of said grippers, said last named means being adapted to displace radially an intermediate portion of the advancing sheet, said sheet gripping means maintaining its hold upon the sheet until after said sheet displacing means has moved to the outermost point of its closed path.

9. In mechanism of the class described, a revolving sheet carrier, sheet gripping means adapted to grip and advance the leading edge of a sheet, said means comprising grippers on said carrier, a shaft eccentrically journaled in the carrier and rotating in a direction opposite to that of the carrier, a roller mounted upon but offset from said shaft moving in a closed path outwardly and inwardly across the path of said grippers, said roller being adapted to contact and wipe against the sheet in a direction away from its leading edge, said grippers maintaining their hold upon the sheet until after said roller has moved to the outermost point of its closed path.

10. In a machine for operating on sheets, a revolving carrier, sheet gripping means adapted to grip and advance the leading edge of a sheet, said means comprising grippers on said carrier, a shaft mounted in the carrier approximately 90° behind the grippers considered with respect to the direction of rotation of the carrier, means for revolving said shaft relative to the carrier once for each revolution of the carrier in the opposite direction, and means moving with said shaft adapted to contact and displace a sheet held by said grippers, said sheet gripping means maintaining its hold upon the sheet until after said sheet contacting means has moved to the outermost point of its path.

11. In a machine for operating on sheets, a revolving carrier, grippers thereon, means for presenting the forward edge of a sheet to the grippers at one point adjacent the carrier, means approximately 180° from said first point for taking a sheet from the grippers, and means moving at constant speed in a complete circular path intersecting the path of said grippers between said points only to engage an intermediate portion of a sheet advancing between said points for moving the trailing edge of the sheet more rapidly than the leading edge thereof.

12. In a machine for operating upon sheets, a rotating carrier, grippers thereon, means for presenting the forward edge of a sheet to the grippers at one point, means at a second point approximately 180° from said first point for taking a sheet from the grippers, and means moving in a complete circular path intersecting the path of said grippers between said points only to engage an intermediate portion of the sheet advancing between said points, said means reaching its outermost position approximately 90° behind said grippers at the time the sheet is taken from said grippers at the said second point.

13. In a machine of the character described, a revoluble sheet transfer carrier, sheet gripping means adapted to grip and advance the leading edge of a sheet, said means comprising sheet grippers on said carrier, and a roller mounted on said carrier to move bodily at a speed proportional to the speed of the grippers in a complete circular path intersecting the path of the grippers and to wipe against the sheet in a direction away from its gripped edge toward its trailing edge, said sheet gripping means maintaining its hold upon the sheet until after said roller has moved to the outermost point of its circular path.

14. In mechanism of the character described, a constant speed revolving carrier having grippers adapted to take the forward edge of a sheet, a revolving transfer device having accelerating, decelerating and constant speed motions in each revolution, said transfer device being adapted during its said constant speed motion to present sheets to said carrier, means associated with said carrier for accelerating the rear portion of a sheet held by said grippers, and means associated with said transfer device for placing a drag on the rear portion of the sheet during the decelerating motion of said transfer device.

15. In mechanism of the character described, a constant speed revolving carrier having grippers adapted to take the forward edge of a sheet, a revoluble transfer device adapted to present sheets to said grippers, means mounted on said carrier movable laterally of the gripper path for placing a loop temporarily in the intermediate portion of the sheet as it travels over said carrier, and means associated with said transfer device for placing a drag on the rear portion of the sheet as said first named means moves in the opposite direction.

16. In mechanism of the character described, a constant speed revolving carrier having grippers adapted to take the forward edge of a sheet, a revoluble transfer device adapted to present sheets to said grippers, means mounted on said carrier movable laterally of the sheet for placing a loop temporarily in the intermediate portion of the sheet as it travels over said carrier, said transfer device having accelerating and decelerating periods of motion in each revolution, and means associated with said transfer device and effective during its decelerating motion for placing a drag on the rear portion of the sheet as it travels over said transfer device.

17. In a machine of the class described, a revolving carrier, sheet gripping means adapted to grip and advance the leading edge of a sheet, said means comprising grippers on said carrier, means mounted on said carrier moving at a speed proportional at all times to the speed of the grippers in a complete closed path intersecting at two points the path of said grippers adapted to engage the sheet at said first intersection point and displace it laterally of the path of its leading edge, and means for creating drag upon the rear portion of the sheet during the period between the greatest displacement and the second intersection point.

18. In a machine of the character described, a constant speed revolving carrier, sheet gripping means adapted to grip and advance the leading edge of a sheet, a revoluble transfer device adapted to present sheets to said revolving carrier, said sheet gripping means comprising grippers on said transfer device and said revolving carrier, means mounted on said carrier moving at a speed proportional at all times to the speed of the carrier grippers in a complete circular path intersecting at two points the path of the carrier grippers adapted to engage the sheet at said first intersection point and thereafter displace it laterally of the path of its leading edge, and means associated with said transfer device for creating a drag upon the rear portion of the sheet during the period of lateral displacement of the sheet.

19. A machine as defined in claim 18, characterized in that said last named means comprises suckers mounted in the periphery of said transfer device.

20. In a machine of the character described, a constant speed revolving carrier, sheet gripping means adapted to grip and advance the leading edge of a sheet, a revoluble transfer device having periods of acceleration, constant speed and deceleration, said transfer device being adapted during its constant speed travel to present sheets to said revolving carrier, said sheet gripping means comprising grippers on said transfer device and on said revolving carrier, means mounted on said carrier moving at a speed proportional at all times to the speed of the carrier grippers in a complete circular path intersecting at two points the path of the said carrier grippers adapted to engage the sheet at said first intersection point and thereafter displace it laterally of the path of its leading edge, the deceleration period of said transfer device occurring while said displacing means is traveling between the point of greatest displacement and the second intersection point, and means associated with said transfer device and effective during its decelerating period for creating a drag upon the rear portion of the sheet.

21. A machine as defined in claim 20, characterized in that said means for creating a drag on the sheet comprises suckers mounted in the periphery of said transfer device.

22. In mechanism of the character described, a revolving sheet carrier, sheet gripping means adapted to grip and advance the leading edge of a sheet, said means comprising grippers on said carrier, means revolving in a direction opposite to that of the carrier about a center moving with said carrier and comprising a bar and a roller journaled on the outer end of said bar, said roller being adapted to engage and displace laterally an intermediate portion of the advancing sheet, said sheet gripping means maintaining its hold upon the sheet until after said roller has effected its maximum displacement of said sheet, and means for adjusting said bar to vary the extent of said lateral displacement.

23. In mechanism of the character described, a revolving carrier, sheet gripping means adapted to grip and advance the leading edge of a sheet, said means comprising grippers on said carrier, a hollow shaft eccentrically mounted on said carrier revolving in a direction opposite to that of said carrier, a shaft extending through said hollow shaft, a plurality of pinions keyed to said last named shaft, guide brackets mounted on said hollow shaft, a plurality of racks slidable in said guide brackets and meshing with said pinions, roller means journaled at the outer ends of said racks, means for angularly adjusting said last named shaft, said roller means being adapted to engage and displace laterally an intermediate portion of the advancing sheet, and said sheet gripping means maintaining its hold upon the sheet until after said roller means has effected the maximum displacement of said sheet.

24. In mechanism of the character described, an impression cylinder having grippers revolving at constant speed, a revolving carrier having grippers adapted to take the leading edge of a sheet and present it to said impression cylinder grippers, a revolving transfer device adapted to present sheets to said carrier grippers, means associated with said carrier for advancing the rear edge of the sheet more rapidly then the surface speed of said impression cylinder, and means associated with said transfer device for placing a drag on the rear portion of the sheet.

25. Mechanism as defined in claim 24, characterized in that said means for placing a drag on the rear portion of the sheet comprises a sucker head having a passage therethrough terminating in a sucker mouth, said head having a transverse passage therethrough intersecting said first named passage, a valve rod slidably mounted in said transverse passage having a port therethrough adapted to bring the rear portion of said first passage into communication with said sucker mouth, and detent means for holding said valve rod in either operative or inoperative position.

26. Mechanism as defined in claim 24, characterized in that said means for placing a drag on the rear portion of the sheet comprises a sucker head having a plurality of spaced passages therethrough terminating in sucker mouths, said head having a transverse passage therethrough intersecting all of said first named passages, a cylindrical valve rod slidably mounted in said transverse passage having annular grooves therein spaced like said first named passages and adapted to bring the rear portions of said first named passages into communication with said sucker mouths, and detent means for holding said valve rod in either operative or inoperative position.

27. In mechanism of the character described, a constant speed revolving carrier adapted to take the forward edge of a sheet, a feed board, a variable speed transfer device adapted to receive sheets from said feed board and transfer them to said grippers, the path of the sheets between said feed board and said carrier being arcuate, means mounted on said carrier movable laterally of the gripper path for placing a loop temporarily in the intermediate portion of the sheet as its gripped edge travels over said carrier, and means effective during the travel of said sheet in said arcuate path for placing a drag on the rear portion of the sheet as said first named means moves in the opposite direction.

28. In mechanism of the character described, a constant speed revolving carrier having grippers adapted to take the forward edge of a sheet, a feed board, a variable speed transfer device adapted to receive sheets from said feed board and transfer them to said grippers, the path of the sheets between said feed board and said carrier being arcuate, means mounted on said carrier movable laterally of the gripper path for placing a loop temporarily in the intermediate portion of the sheet as its gripped edge travels over said carrier, and means effective during the travel of the rear portion of the sheet in said arcuate path for placing a drag thereon.

29. In a printing press, a revolving carrier having grippers adapted to take the leading edge of a sheet and advance it into said press, a feed board, a transfer device adapted to receive sheets from said feed board and advance them through an arcuate path to said carrier grippers, means associated with said carrier for advancing the rear edge of the sheet more rapidly than the leading edge thereof, and means associated with said transfer device for placing a drag on the rear portion of the sheet as it travels through said arcuate path.

30. In mechanism of the character stated, a revolving carrier having grippers adapted to take the forward edge of a sheet, a feed board, mechanism for transferring and guiding sheets through a defined path from said feed board to said grippers, said transfer mechanism including sheet guiding means which is stationary for at least a portion of the press cycle, means associated with said carrier for advancing the rear edge of the sheet more rapidly than its leading edge, and means associated with said transfer mechanism for placing a drag on the rear portion of the sheet during the time said sheet guiding means is stationary.

JAMES R. WOOD.

REFERENCES CITED

The following references are of record in the file of this patent:

UNITED STATES PATENTS

| Number | Name | Date |
| --- | --- | --- |
| 909,921 | Markman | Jan. 19, 1909 |
| 1,587,816 | Broadmeyer | June 8, 1926 |
| 1,603,349 | Marquardt | Oct. 19, 1926 |
| 2,095,276 | Wormser | Oct. 12, 1937 |
| 2,192,908 | Harrold et al. | Mar. 12, 1940 |
| 2,192,916 | Kaddeland et al. | Mar. 12, 1940 |
| 2,210,573 | Eckhard | Aug. 6, 1940 |
| 2,245,396 | Harrold et al. | June 10, 1941 |
| 2,248,079 | Harrold et al. | July 8, 1941 |

FOREIGN PATENTS

| Number | Country | Date |
| --- | --- | --- |
| 341,792 | Great Britain | Jan. 22, 1931 |